United States Patent [19]

Meynier

[11] Patent Number: 5,052,274
[45] Date of Patent: Oct. 1, 1991

[54] TANDEM BRAKE BOOSTER WITH RETURN SPRING ARRANGEMENT FOR REAR PISTON CHAMBER

[75] Inventor: Guy Meynier, Aulnay Sous Bois, France

[73] Assignee: Bendix France, Drancy, France

[21] Appl. No.: 277,612

[22] Filed: Nov. 29, 1988

[30] Foreign Application Priority Data

Dec. 1, 1987 [FR] France ................. 87 16618

[51] Int. Cl.$^5$ ............................................. B60T 13/567
[52] U.S. Cl. ......................................................... 92/49
[58] Field of Search .................... 92/48, 49; 91/369.2, 91/376 R

[56] References Cited

U.S. PATENT DOCUMENTS

| | | | |
|---|---|---|---|
| 3,096,689 | 7/1963 | Kytta | 92/48 X |
| 3,805,680 | 4/1974 | Weatherhogg | 92/48 |
| 4,339,921 | 7/1982 | Schanz | 91/369.1 X |
| 4,345,506 | 8/1982 | Ohomi | 92/48 X |
| 4,347,779 | 9/1982 | Belart | 92/48 X |
| 4,434,619 | 3/1984 | Kobayashi | 60/547.1 |
| 4,495,854 | 1/1985 | Hibino | 92/48 X |
| 4,516,474 | 5/1985 | Ochiai | 92/48 X |
| 4,718,326 | 1/1988 | Sugiura et al. | 92/48 X |

FOREIGN PATENT DOCUMENTS

| | | |
|---|---|---|
| 2225319 | 8/1974 | France . |
| 1281596 | 7/1972 | United Kingdom . |
| 2132710 | 7/1984 | United Kingdom . |

*Primary Examiner*—Edward K. Look
*Assistant Examiner*—George Kapsalas
*Attorney, Agent, or Firm*—Larry J. Palguta; Ken C. Decker

[57] ABSTRACT

A rigid partition (18) internally delimiting a front space and a rear space in the outer casing (10) of a brake servo unit is fastened on an approximately cylindrical extension (14a) of a reinforcing plate (14) internally lining the front portion of the casing. A two-stage servo unit of simplified construction and of small dimensions, utilizable in the brake circuit of motor vehicles, is thus obtained.

5 Claims, 2 Drawing Sheets

TANDEM BRAKE BOOSTER WITH RETURN SPRING ARRANGEMENT FOR REAR PISTON CHAMBER

BACKGROUND OF THE INVENTION

The invention relates to a brake servo unit and is advantageously applicable to all motor vehicles whose brake circuit is equipped with a servo unit of this kind.

With the particular aim of improving streamlining, the design of modern vehicles tends to provide increasingly sloping engine bonnets, whereas the number of accessories disposed under the bonnet tends rather to increase. For this reason motor vehicle manufacturers impose maximum dimensions on some of these accessories. In particular, the outside diameter of brake servo units is generally limited by motor vehicle manufacturers to a certain value.

In order to obtain a sufficiently high brake boost power, especially for high-speed vehicles, manufacturers of brake servo units have therefore been led to design two-stage servo units having an increased effective section without any increase of the outside diameter of the servo unit. As an illustration, a servo unit of this kind is described in document GB-A-1 157 861.

As this document shows, these two-stage servo units are generally formed by placing end to end two booster chambers of approximately the same diameter. The limitation of the diameter of the servo unit then leads to an increase of its length, which is not always acceptable to the manufacturer.

Furthermore, the front wall of the casing of brake servo units is usually lined with a reinforcing plate. The number of plates constituting the frame of a two-stage servo unit and the number of fluidtight connections between these plates are therefore high, with a consequent increase of both production time and the cost of such servo units.

Accordingly, it has already been proposed, in the document GB-A-2,132,720, to construct a two-stage servo unit by arranging one servo unit within the other. Such a servo unit comprises two pistons disposed coaxially, each one being subjected to a pressure difference exerted on the diaphragm which is associated therewith, one of the diaphragms having an effective surface greater than that of the other. When the pistons are in their extreme operating position, the diaphragm of smaller diameter is partially received within that of larger diameter over a given length; this permits the reduction of the axial length of the two-stage servo unit by this given length, and thus correspondingly of the total volume of the servo unit, for a same booster force.

Nevertheless, this servo unit exhibits numerous disadvantages inherent in its tandem design. This design is similar to that of the two-stage servo units in which the two booster chambers are placed end to end. In fact, the two pistons are disposed end to end and are restored to their rest position by a spring disposed within the front chamber of the second servo unit, this spring acting on the second piston which, in its turn, acts on the first piston, itself acting on the actuating rod connected to the brake pedal. Applied to a servo unit in which the booster chambers are fitted into one another, this design inevitably leads to a reduction of the stroke of the pistons, and thus of the control and push rods; this is incompatible with certain harsh operating conditions.

Furthermore, with the arrangement of the pistons end to end, the reaction disc, in the rest position, is constantly subjected to the stress of the main restoring spring, and during operation it transmits the forces only between the first piston and the output rod and is insensitive to the action of the second piston. In order to remedy this disadvantage, it is then necessary to oversize the plunger and thus the control valve.

SUMMARY OF THE INVENTION

The present invention relates precisely to a twostage brake servo unit whose special design enables it to produce an increased boost force with a diameter and length of the servo unit practically identical to those of a single-stage servo unit, the control valve as well as the stroke of the control and output means being identical to those of a single-stage servo unit.

According to the invention, this result is obtained by means of a brake servo unit, comprising an outer casing, a reinforcing plate fastened internally to a front part of the casing, and comprising an extension which is approximately cylindrical and oriented towards the rear within the casing, and a rigid partition supported within the casing by the reinforcing plate and fixed sealingly to the end of this extension to delimit a front space and a rear space inside the said casing, a piston passing sealingly through the rigid partition, two deformable partitions dividing each of the front and rear spaces into a front chamber and a rear chamber, at least one passage connecting the two front chambers, at least one passage connecting the two rear chambers, and resilient means tending to displace the deformable partitions towards their rear rest position characterized in that the deformable partitions are fastened by their internal peripheral edge onto the same piston, and in that the resilient means comprises a helical spring received in the front chamber of the rear space, around the approximately cylindrical extension of the reinforcing plate.

As a result of this special arrangement, the front and rear spaces providing increased braking assistance are placed inside a casing whose outside dimensions are identical to those of a single-stage servo unit. Furthermore, the servo unit according to the invention utilizes a control valve identical to that of the single-stage servo units, in such a manner that the cost is reduced and its manufacture is facilitated as compared with the existing two-stage servo units.

BRIEF DESCRIPTION OF THE DRAWINGS

Two embodiments of the invention will now be described, as strictly non-limitative examples, with reference to the accompanying drawings, in which.

DETAILED DESCRIPTION OF THE PREFERRED EMBODIMENTS

Figure 1:
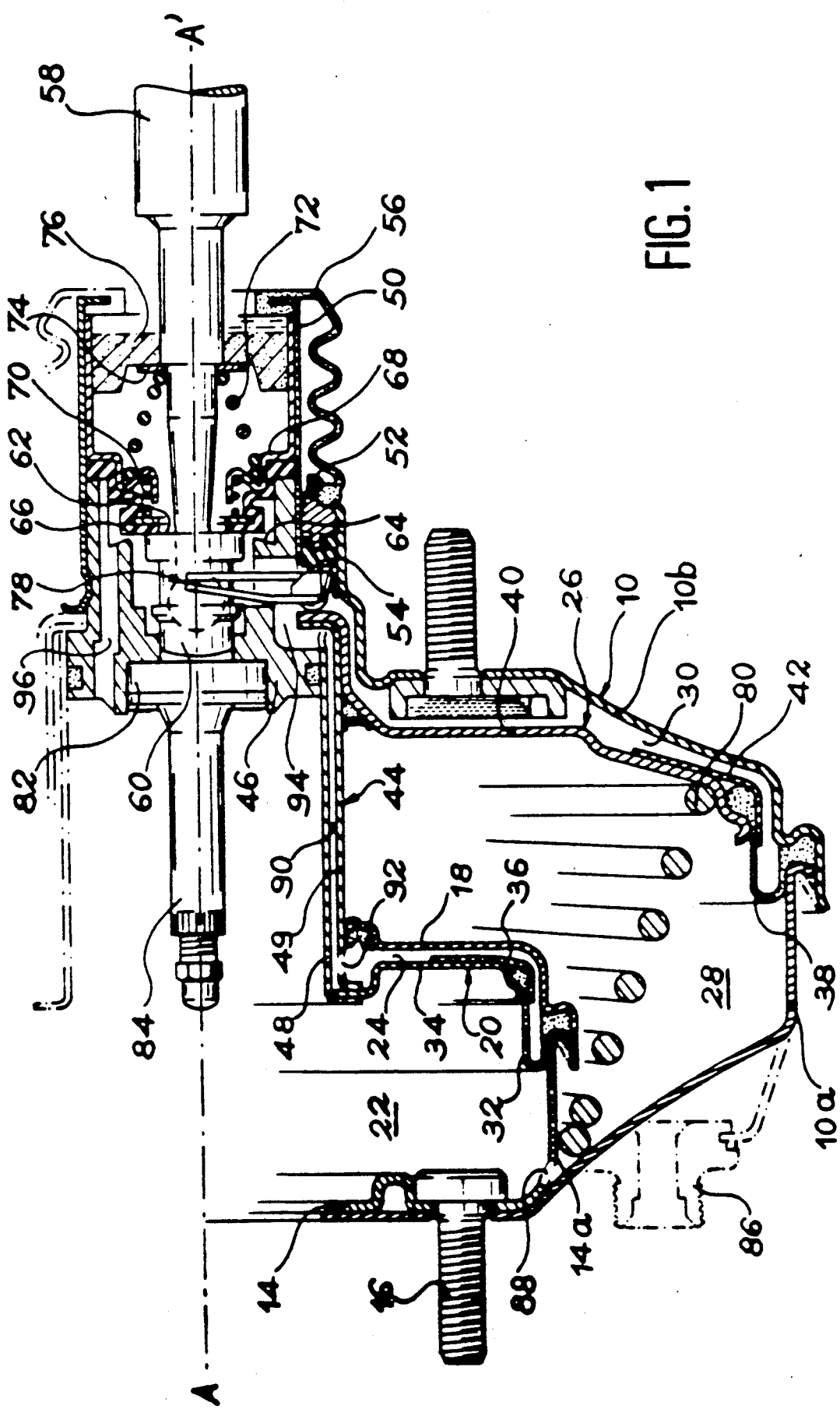
FIG. 1 is a side view in longitudinal section, showing the bottom half of a brake servo unit constructed in accordance with a first embodiment of the invention.

FIG. 1 shows a part of a brake servo unit intended to be disposed in the usual way between the brake pedal of a vehicle and the master cylinder controlling the hydraulic brake circuit. By convention, the part of the servo unit which faces the master cylinder and is situated on the left in the drawing is called the "front", while the part facing the brake pedal and situated on the right in the drawing is called the "rear".

The servo unit shown in FIG. 1 comprises an outer shell-shaped casing 10 rotationally symmetrical about an axis A—A'. This casing 10 is composed of two dished plates or sheets 10a, 10b crimped together at their periphery.

In a manner known per se, the sheet 10a forming the front of the servo unit casing 10 is reinforced in its substantially planar front portion, which is at right angles to the axis A—A', by a reinforcing plate 14. This plate 14 is disposed inside the casing 10, and is in turn fastened on the front part of the sheet 10a and on a member (not shown) carrying the master cylinder by means of bolts (generally two in number) which are distributed over the circumference, and of which one is shown at 16 in FIG. 1.

The reinforcing plate 14 has an approximately cylindrical extension 14a directed towards the rear inside the casing 10. The diameter of this extension 14a is substantially smaller than the outside diameter of the casing 10, so that an annular space is formed between these two parts. The front end of a rigid partition 18 is fastened by crimping to the rear end of the extension 14a of the reinforcing plate 14. This partition 18 has an approximately planar rear portion lying at right angles to the axis A—A' and situated roughly half-way between the front and rear ends of the casing 10.

The partition 18, which is extended in the forward direction by the extension 14a of the reinforcing plate 14, thus delimits inside the casing 10 a front space and a rear space. Each of thee two spaces is divided into a front chamber and a rear chamber by a deformable partition approximately at right angles to the axis A—A'.

More precisely, a first deformable partition 20 divides the front space, formed inside the reinforcing plate 14 and the partition 18, into a front chamber 22 and a rear chamber 24. Similarly, a second deformable partition 26 divides the rear space, formed between the casing 10 and the partition 18, into a front chamber 28 and a rear chamber 30.

In its peripheral region the first deformable partition 20 comprises a flexible diaphragm 32 of elastomer material, whose outer peripheral edge forms a bead held captive between the crimped edges of the partition 18 and of the extension 14a of the reinforcing plate 14. The inner peripheral edge of the flexible diaphragm 32 also ends in a bead held in a groove formed in the outer periphery of a metal support disc 34 by means of a plate 36. The first deformable partition 20 thus consists of the flexible diaphragm 32, the plate 36 and the support disc 34.

In comparable fashion the outer part of the second deformable partition 26 is formed by a flexible diaphragm 38 of elastomer material, provided at its outer periphery with a bead held captive by the crimping of the sheets 10a and 10b of the casing. The flexible diaphragm 38 likewise ends internally in the form of a bead received in a groove formed on the outer periphery of a metal support disc 40 and held in said groove by a plate 42. The second deformable wall thus consists of the flexible diaphragm 38, the plate 42 and the support disc 40.

According to the invention, the deformable partitions 20 and 26 are fastened by the internal peripheral edges of their support discs, 34 and 40 respectively, sealingly on a piston 44 centered on the axis A—A' of the servo unit and capable of moving along this axis.

More precisely, the piston 44 comprises a massive hollow member 46 on which are fixed two coaxial tubes 48 and 49 projecting forwards and a coaxial tube 50 projecting towards the rear.

The inner peripheral edge of the metal disc 34 is held captive between the radially outwardly bent-over front ends of the tubes 48 and 49. In comparable manner the inner peripheral edge of the metal disc 40 is held captive between the radially outwardly bent-over front end of the tube 50 and the radially inwardly bent-over rear end of the tube 49. The rear end of the tube 49 in turn bears against a shoulder formed on the outer peripheral surface of the massive member 46. The tubes 48, 49 and 50 are locked on the massive member 46 by a portion of the tube 50 close to its front end, said portion being crimped in a groove formed in the outer peripheral surface of the massive member 46.

The piston 44 passes sealingly through a central passage formed in the sheet 10b forming the rear of the servo unit casing. This central passage is bounded by a tubular central portion of the sheet 10b, which portion projects rearward and holds captive a ring 52. At its front end the ring 52 carries an annular seal 54, which is in sealing contact both with the central tubular portion of the sheet 10b and with the outer surface of the tube 50.

A sealing bellows 56 is likewise interposed between the ring 52 and the rear end of the tube 50 in order to prevent the deposition of dust on the surface of the latter. This sealing bellows 56 is provided at its front end with a bead received in a groove formed in the ring 52, while at its rear end it is engaged over the radially inwardly bent-over rear end of the tube 50.

In known manner the servo unit is operated by a control rod 58 which is disposed along the axis A—A' and the rear end of which is operated by the brake pedal (not shown) of the vehicle. The front end of the rod 58 bears against a plunger 60 sliding in a central bore formed in the massive member 46.

The rear end of the plunger 60 and a rearwardly facing shoulder formed in the central bore of the massive member 46 constitute two valve seats designated 62 and 64 respectively in FIG. 1.

An annular valve 66 is housed between the control rod 58 and the massive member 46, in such a manner as to be able to come to bear against the valve seats 62 and 64. This valve 66 is formed at the end of a sleeve of elastomer material, whose opposite end forms a bead held captive between the rear end of the massive member 46 and a cup 68 lining the interior of the tube 50. A compression spring 70 is interposed between the cup 68 and the valve 66 for the purpose of applying the latter against at least one of the valve seats 62 and 64.

A second compression spring 72 is held captive between the cup 68 and a washer 74 bearing against a forward facing shoulder formed on the control rod 58. The spring 72 normally holds the washer 74 against an air filter 76 disposed in the tube 50, around the control rod 58.

A system of stops 78 mounted in the plunger 60 determines the rear position of rest of the piston 44 and also the stroke of the plunger 60 inside the piston 44.

According to the invention, a compression spring 80 is received in the front chamber 28 of the rear space of the servo unit, and normally maintains the deformable partition 26 in its rear rest position determined by the system of stops 78 coming into supporting contact against the seal 54. As the deformable partition 26 is fastened to the piston 44, on which the deformable partition 20 is fastened, these three elements are simultaneously restored to their rear rest position by the spring 80, the deformable partition 26 being directly pushed by the spring 80, the deformable partition 20 being drawn by the piston 44.

In the practical assembly shown in FIG. 1, the compression spring 80 is a frustoconical helical spring whose end having the larger diameter bears against the metal disc 40 at a point near its outer periphery, while its end having the smaller diameter is supported in the angle formed between the cylindrical extension 14a of the reinforcing plate 14 and a frustoconical zone of the front portion 10a of the casing 10. This spring 80 thus partly surrounds the cylindrical extension 14a.

In known manner, a reaction disc 82 made of an elastomer material is disposed in the front part of larger diameter of the central bore formed in the massive member 46, at a short distance from the end of the plunger 60. The reaction disc 82 bears against the rear end of a servo unit output rod 84, the front end of which operates the piston of a master cylinder (not shown).

Under the normal operating conditions of the servo unit the front chamber 28 of the servo unit is connected to a vacuum source by means of a connector 86 shown in dot-dash lines in FIG. 1. To ensure that a vacuum is also produced in the front chamber 22, the spaces 22 and 28 intercommunicate by way of one or more holes 88 formed in the cylindrical extension 14a of the reinforcing plate 14, in the front portion of said extension.

In addition, the rear chambers 24 and 30 of the front and rear spaces bounded by the partition 18 likewise intercommunicate by way of a passage. This passage comprises an annular passage 90 formed between the two concentric tubes 48 and 49 and communicating with the rear chamber 24 by way of one or more holes 92 formed in the outer tube, and with the rear camber 30 by way of a passage 94 formed in the massive member 46.

The operation of the servo unit described above with reference to FIG. 1 is conventional and will not be described in detail.

It will simply be recalled here that when the brake pedal is not operated the valve 66 bears against the valve seat 62 and is held off the valve seat 64. This being the case, passages (not shown) formed in the massive member 46 bring the front chamber 22 into communication with the rear chambers 24 and 30. In view of the fact that the front chambers 22 and 28 are in communication with one another, all the chambers of the servo unit are then under vacuum and the piston 44 is held in the rear position of rest through the action of the spring 80.

When the brake pedal is operated, the control rod 58 and also the plunger 60 are moved in the forward direction. As the result of this movement, the valve 66 comes to bear against the seat 64 and is moved off the valve seat 62. This being the case, communication between the front chamber 22 and the rear chambers 24 and 30 is interrupted, and the last-mentioned chambers are brought into communication with the outside atmosphere by way of the air filter 76. The atmospheric pressure introduced into the rear chambers 24 and 30 applies to the deformable partitions 20 and 26 a force greater than the force exerted by the spring 80, in such a manner that the piston 44 is moved in the forward direction, carrying with it the rod 84. Power braking is thus achieved.

Figure 2:
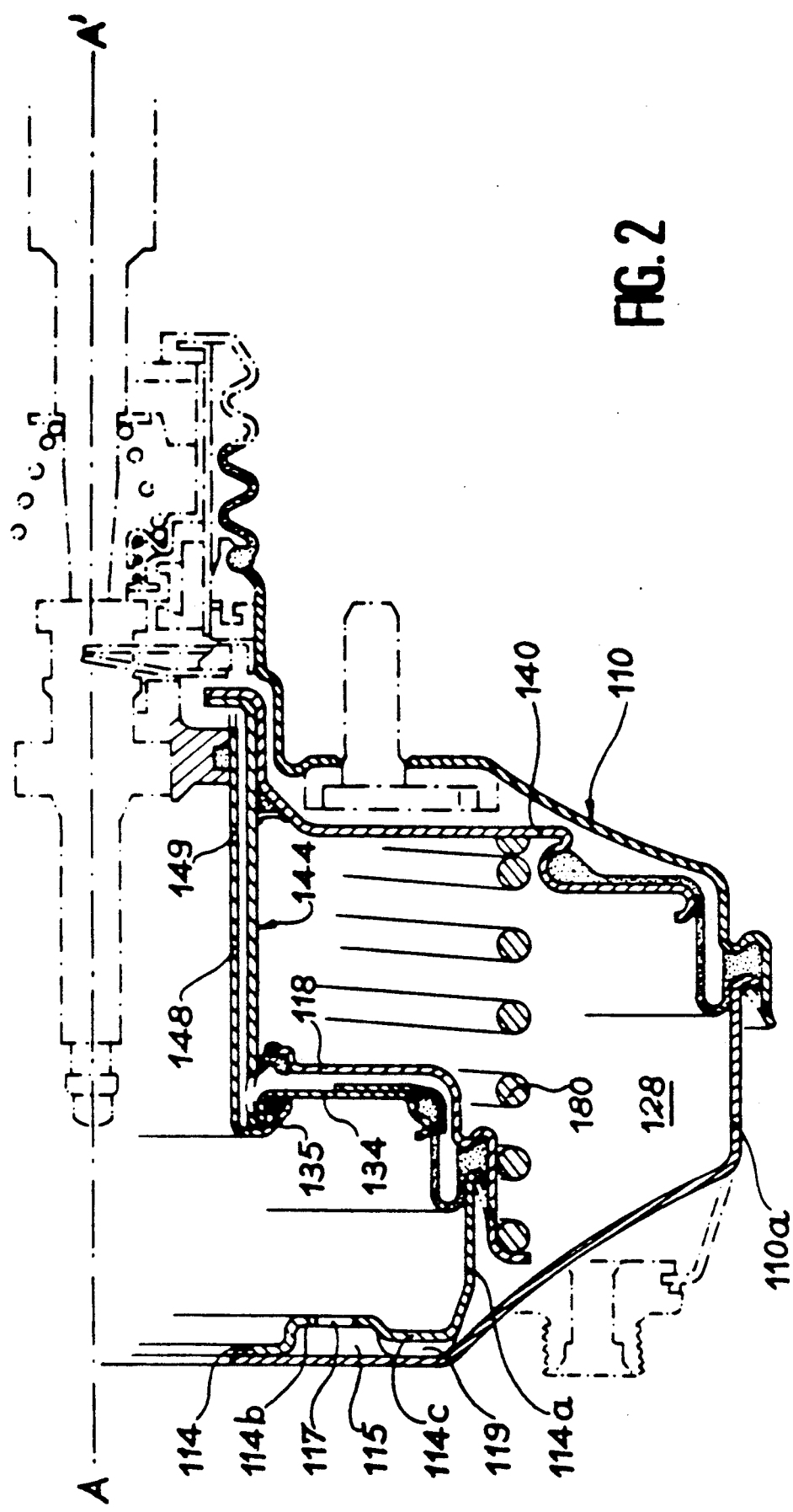
FIG. 2 is a similar view to FIG. 1, illustrating a second embodiment of the invention.

FIG. 2 illustrates a second form of construction of the servo unit according to the invention. The essential characteristics of the servo unit described above in detail with reference to FIG. 1 are found again in FIG. 2, so that no detailed description will be given of FIG. 2. On the contrary, only those characteristics :f this second embodiment which differ from those of the first embodiment will now be described.

In order to facilitate understanding, members comparable to those in the first embodiment will be given the same reference numerals increased by 100.

One of the principal differences between the embodiment shown in FIG. 2 and the embodiment already described with reference to FIG. 1 relates to communication between the front chambers 122 and 128 of the front and rear spaces bounded by the partition 118 inside the servo unit casing 110.

As is per se conventional, the substantially planar front part, perpendicular to the axis A—A', of the reinforcing plate 114 is provided with an annular rib 114b which, together with the substantially planar front part of the casing sheet 110a, delimits an annular chamber 115 communicating with the chamber 122 by way of at least one hole 117 formed in the annular rib 114b. This annular chamber 115 is also in communication with the chamber 128 by way of one or more spaces 119 delimited between ribs 114c formed, for example radially, in the reinforcing plate 114 and the substantially plane front part of the sheet 110a.

The embodiment illustrated in FIG. 2 also differs from that shown in FIG. 1 through the shape and arrangement of the spring 180.

In FIG. 2 the compression spring 180 is a cylindrical helical spring of which one end bears against a plane part, perpendicular to the axis A—A', of the metal disc 140, while its opposite end bears against the radially outwardly bent-over front end of the partition 118. As previously, the spring 180 partly surrounds the cylindrical extension 114a of the reinforcing plate 114.

In the embodiment shown in FIG. 2, the shape of the metal plate 140 is in addition slightly different from that of the disc 40 in FIG. 1, and this in particular makes it possible to dispense with the plate 42.

Another difference between the two embodiments relates to the fastening of the disc 134 on the tubes 148 and 149 of the piston 144. In the case of FIG. 2, the disc 134 has a tubular central portion folded over in the forward direction around the outer tube 149, and the inner tube 148 has a folded-over, crimped end by which an 0-ring 135 is held captive between said tube and the disc 134.

The invention is obviously not restricted to the embodiments described above as examples, but covers all variants thereof. In particular, it will readily be understood that one or more of the variants described with reference to FIG. 2 can be used in the embodiment illustrated in FIG. 1. Similarly, other variant constructions within the scope of those versed in the art may be contemplated for the connection of the different components constituting the servo unit, without going beyond the scope of the invention.

I claim:

1. A brake servo unit, comprising an outer casing, a reinforcing plate fastened internally to a front part of the casing and comprising an extension which is approximately cylindrical and oriented towards the rear of the casing, and a rigid partition supported within the casing by the reinforcing plate and fixed sealingly to an end of the extension to delimit a front space and a rear space inside the casing, a piston passing sealingly through the rigid partition, two deformable partitions dividing each of the front and rear spaces into respective front and rear chambers, at least one passage connecting the front chambers, at least one passage connecting the rear chambers, and resilient means tending to displace the deformable partitions toward rear rest positions, characterized in that the deformable partitions are fastened by internal peripheral edges onto the piston and in that he resilient means comprises a helical spring located within the front chamber of the rear space and radially surrounding the approximately cylindrical extension of the reinforcing plate.

2. The servo unit according to claim 1, characterized in that the helical spring exhibits a frustoconical shape.

3. The servo unit according to claim 1, characterized in that the helical spring exhibits a cylindrical shape.

4. The servo unit according to claim 1, characterized in that the rigid partition is fastened to the end of the extension of the reinforcing plate by crimping and captures a peripheral bead formed on the respective deformable partition received in the front space.

5. A brake servo unit, comprising an outer casing, a reinforcing plate fastened internally to a front part of the casing and comprising an extension which is approximately cylindrical and oriented towards the rear of the casing, and a rigid partition supported within the casing by the reinforcing plate and fixed sealingly to an end of the extension to delimit a front space and a rear space inside the casing, a piston passing sealingly through the rigid partition, two deformable partitions dividing each of the front and rear spaces into respective front and rear chambers, at least one passage connecting the front chambers, at least one passage connecting the rear chambers, and resilient means tending ti displace the deformable partitions toward rear rest positions, characterized in that the deformable partitions are fastened by internal peripheral edges onto the piston and in that the resilient means comprises a helical spring received in the front chamber of the rear space and around the approximately cylindrical extension of the reinforcing plate, the reinforcing plate comprising an annular reinforcing rib delimiting together with an adjacent part of the casing an annular communication chamber, the passage which connects the front chambers including the annular communication chamber which communicates with the front chamber of the front space by at least one hole formed in the annular reinforcing rib and with the front chamber of the rear space by at least one space delimited between another rib formed in the reinforcing plate and an adjacent part of the casing.

* * * * *